(12) United States Patent
Evans (10) Patent No.: US 6,352,377 B1
(45) Date of Patent: Mar. 5, 2002

(54) CAMERA ADAPTER FOR ENABLING MICROSCOPIC AND MACROSCOPIC PHOTOGRAPHY

(76) Inventor: Anthony M. Evans, 208 Albany Ave. West, Walkersville, MD (US) 21793

( * ) Notice: Subject to any disclaimer, the term of this patent is extended or adjusted under 35 U.S.C. 154(b) by 0 days.

(21) Appl. No.: 09/460,379

(22) Filed: Dec. 13, 1999

Related U.S. Application Data (60) Provisional application No. 60/112,225, filed on Dec. 15, 1998.

(51) Int. Cl.[7] .................. G03B 17/00; G03B 21/36; G03B 23/00
(52) U.S. Cl. ..................................... 396/419; 396/432
(58) Field of Search ................. 396/429, 432, 396/419, 422, 425, 529, 530, 59

(56) References Cited

U.S. PATENT DOCUMENTS

| | | | | |
|---|---|---|---|---|
| 4,021,825 A | * | 5/1977 | McCann et al. | 396/432 |
| 4,498,749 A | * | 2/1985 | Hoover | 396/432 |
| 5,006,872 A | * | 4/1991 | Parker | 396/432 |
| 5,664,233 A | * | 9/1997 | Suzuka | 396/59 |
| 5,835,807 A | * | 11/1998 | Brock | 396/419 |

OTHER PUBLICATIONS

Polaroid Digital Microscope Camera Product Brochure, Polaroid Corporation, Cambridge, Massachusetts.
SV Micro Digital Camera Product Brochure, Sound Vision, Dec. 1, 1998.

* cited by examiner

Primary Examiner—Christopher E. Mahoney
(74) Attorney, Agent, or Firm—McDermott, Will & Emery (57) ABSTRACT

An apparatus for operatively connecting a camera to a microscope allows the camera to be quickly and easily converted for use in a normal manner. The apparatus includes a bracket assembly that securely retains the camera, and a displacement arrangement movably coupled to the bracket assembly. A coupler is attached to the displacement arrangement in order to secure the apparatus to the microscope so that an image viewable through the microscope can be photographed by the camera.

25 Claims, 6 Drawing Sheets

CAMERA ADAPTER FOR ENABLING MICROSCOPIC AND MACROSCOPIC PHOTOGRAPHY

This appln claims benefit of Prov. No. 60/112,225 filed Dec. 15, 1998.

BACKGROUND OF THE INVENTION

1. Technical Field

The present invention relates generally to photography and, more particularly, to an adapter for operatively coupling a camera to a microscope.

2. Description of the Related Art

Microscopes are commonly used by researchers and investigators to examine samples under high magnification. During the course of utilizing the microscope, it often becomes necessary or desirable to obtain a photograph that captures one's findings for later review or display. Such a feature is often advantageous because it eliminates the need to repeat certain experiments each time the results must be presented or reexamined. Many microscopes incorporate beam splitting assemblies, such as trinocular tubes, for coupling to other viewing apparatus.

Various adapters exist for coupling cameras to a microscope in order to photograph images that are viewable through the objective lens of the microscope. Most of these devices, however, are uniquely designed for particular cameras. For example, different manufacturers of single lens reflex (SLR) cameras incorporate different optical specifications for the camera lens in order to project a focused image on the film plane. In connecting a 35 mm SLR camera using such adapters, it is necessary to remove the lens of the camera. Consequently, the adapter must include the necessary optics to insure that the image will be properly focused on the film plane of the camera. Accordingly, each adapter must be specifically designed for each camera that will be used with the microscope. The adapter must be also designed specifically for the microscope that will be used in conjunction with the particularly camera.

Such an arrangement, requiring camera and microscope-specific adapters, presents various drawbacks. First, a coupling device designed for a particular microscope and camera pair cannot be used with a different microscope and/or camera, thereby restricting flexibility and increasing costs. Additionally, once a camera has been adapted for use in conjunction with a microscope, it becomes extremely difficult to use the camera without the microscope. Specifically, once the lens is removed from the camera, it must be properly packaged and stored in order avoid being damaged. Hence, use of the camera in a normal manner requires that the camera first be disengaged from the coupling device, which is often complicated. Next, the camera lens must be retrieved and removed from its packaging in order to attach it to the camera.

Accordingly, there exists a need for a device that is capable of quickly and easily attaching a camera to a microscope, with out encumbering the carmera's ability to be detached from the microscope and used in a normal manner.

DISCLOSURE OF THE INVENTION

An advantage of the present invention is an adapter that allows a camera to be attached to any microscope, while also facilitating quick and convenient detachment of the camera from the microscope so that the camera can be used in a normal manner.

This and other advantages are achieved by the present invention wherein an apparatus for operatively connecting a camera to a microscope includes a coupler for securing the apparatus to an eyepiece of the microscope, and a displacement arrangement for displacing the coupler from the path of the camera lens so that the camera can be used in a normal manner.

In accordance with one aspect of the invention, an apparatus is provided for operatively connecting a camera to a microscope. The apparatus includes a bracket assembly that is used to securely retain the camera, and a displacement arrangement that is movably coupled to the bracket assembly. A coupler having a generally cylindrical configuration that defines an optical passage is coupled to the displacement arrangement. The coupler is used to secure the apparatus to an eyepiece of the microscope. Further, the optical passage defined by the coupler is positionable in registry with a lens of the camera so that an image viewable through the eyepiece of the microscope can be photographed by the camera.

The apparatus of the present invention allows various types of cameras to be quickly and easily configured for microscopic photography. For example, the bracket assembly can be used to retain any digital or point-and-shoot camera and attach the camera to a microscope. Hence, the need for expensive adapters designed for only one specific brand and/or model single lens reflex (SLR) camera can be reduced. In addition, the apparatus can be removed from one camera and quickly attached to a different camera.

In accordance with another aspect of the invention, a camera is provided for capturing images that are viewable through a microscope. The camera includes a camera body having a camera lens and a shutter release button, and a microscope adapter. The microscope adapter includes a displacement arrangement that is movably coupled to the camera body. A coupler having a generally cylindrical configuration that defines an optical passage is attached to the displacement arrangement for securely retaining the microscope adapter to an eyepiece of the microscope. The optical passage of the coupler can be positioned in registry with the camera lens in order to photograph images that are viewed through the eyepiece of the microscope. The camera of the instant invention can be easily coupled to a microscope so that photographs of a sample can be taken. In addition, the microscope adapter allows the camera to be quickly removed from one microscope and attached to a different microscope. Furthermore, the displacement arrangement allows the coupler to be positioned out of registry with the camera lens so that the camera can be used in a normal manner.

In accordance with another aspect of the invention, a system is provided for microscopic photography. The system includes a camera, a microscope, and a microscope adapter that is used to operatively connect the camera to the microscope. The microscope adapter includes a bracket assembly that securely retains the camera. A displacement arrangement is movably coupled to the assembly. A coupler is attached to the displacement arrangement in order to secure the microscope adapter in the eyepiece of the microscope. The configuration of the coupler defines an optical passage that can be positioned in registry with the camera lens so that images viewed through the microscope can be photographed.

Additional advantages and novel features of the present invention will be set forth in part in the description which follows, and in part will become apparent to those skilled in the art upon examination of the following, or may be learned by practice of the present invention. The embodiments shown and described provide an illustration of the best mode contemplated for carrying out the present invention. The invention is capable of modifications in various obvious respects, all without departing from the spirit and scope thereof. Accordingly, the drawings and description are to be regarded as illustrative in nature, and not as restrictive. The advantages of the present invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

DETAILED DESCRIPTION OF THE PREFERRED EMBODIMENTS

Figure 1:
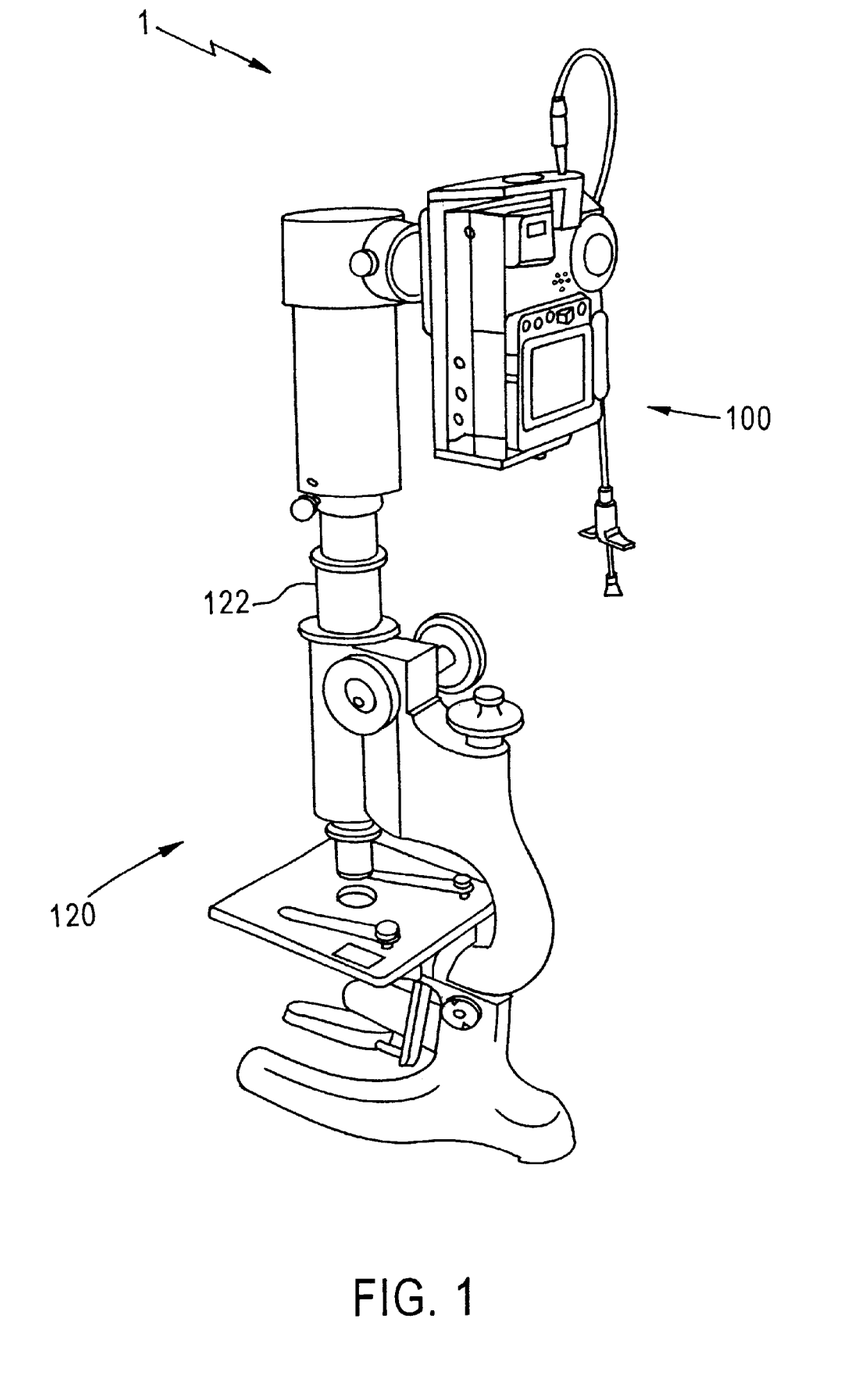
FIG. 1 is a perspective view of a microscopic photography system constructed in accordance with an embodiment of the present invention.
Figure 2:
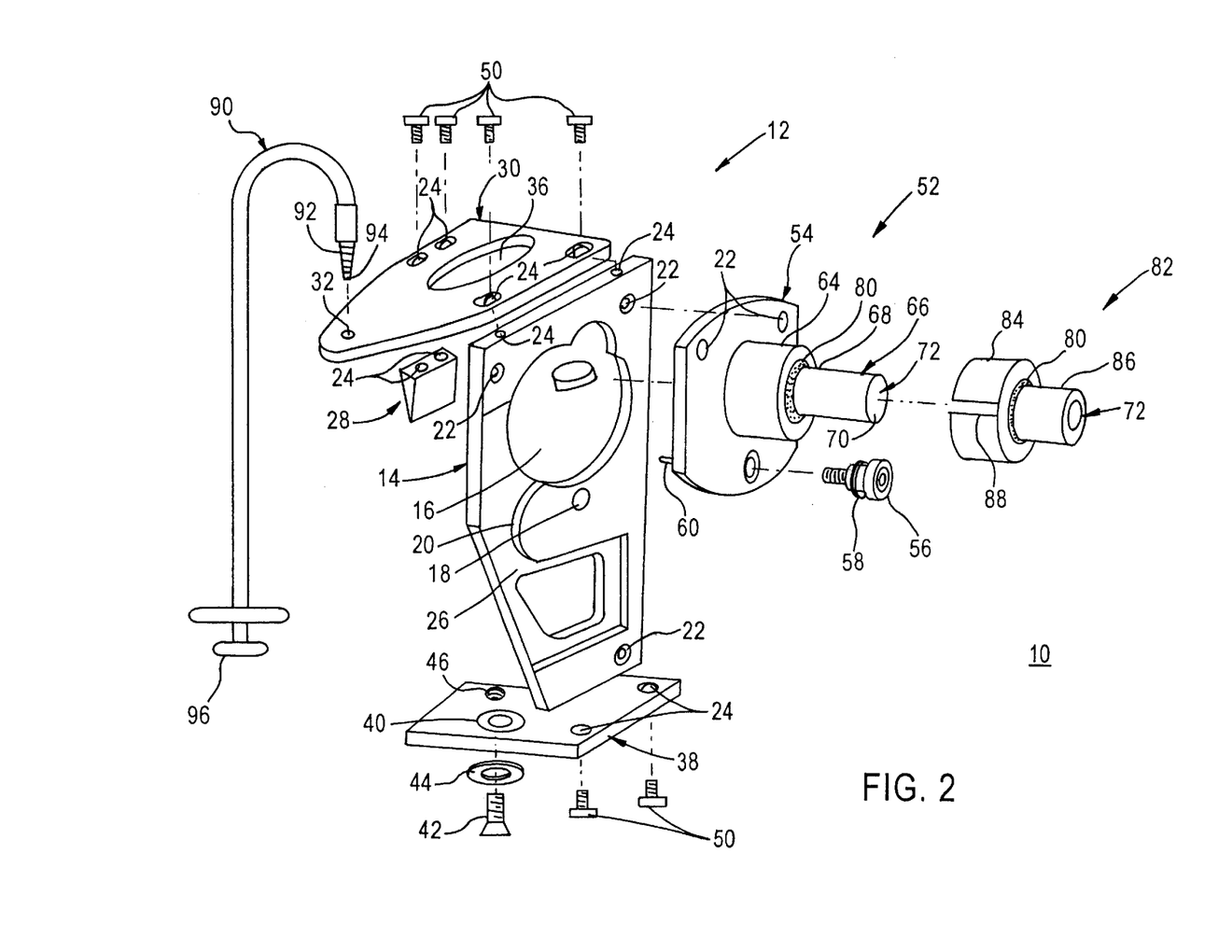
FIG. 2 is an exploded view of a microscope adapter used to attach a camera to a microscope in the microscopic photography system of FIG. 1.

Referring now to the drawings and initially to FIGS. 1 and 2, there is shown a microscopic photography system 1 constructed in accordance with an embodiment of the present invention. The microscopic photography system 1 includes a microscope adapter 10 that attaches a camera 100 to a microscope 120. As illustrated with additional details in FIG. 2, the microscope adapter 10 includes a bracket assembly 12 and a displacement arrangement 52 including a coupler 66 used to interconnect the microscope adapter 10 and the microscope 120.

The bracket assembly 12 includes a front mounting plate 14 secured to the front of the camera 100. The front mounting plate 14 includes a lens opening 16 that is positionable in registry with a lens 102 (FIG. 3) of the camera 100. The front mounting plate 14 contains an aperture 18 that is provided for receiving a pivot bolt. A guide slot 20 defining a prescribed pathway can also formed on the surface of the front mounting plate 14. A plurality of magnets 22 are secured to the surface of the front mounting plate 14. In addition, the magnets 22 are disposed such that they recessed within the surface of front mounting plate 14. The front mounting plate 14 also includes a plurality of threaded inlets 24 and a cutout 26.

Figure 3:
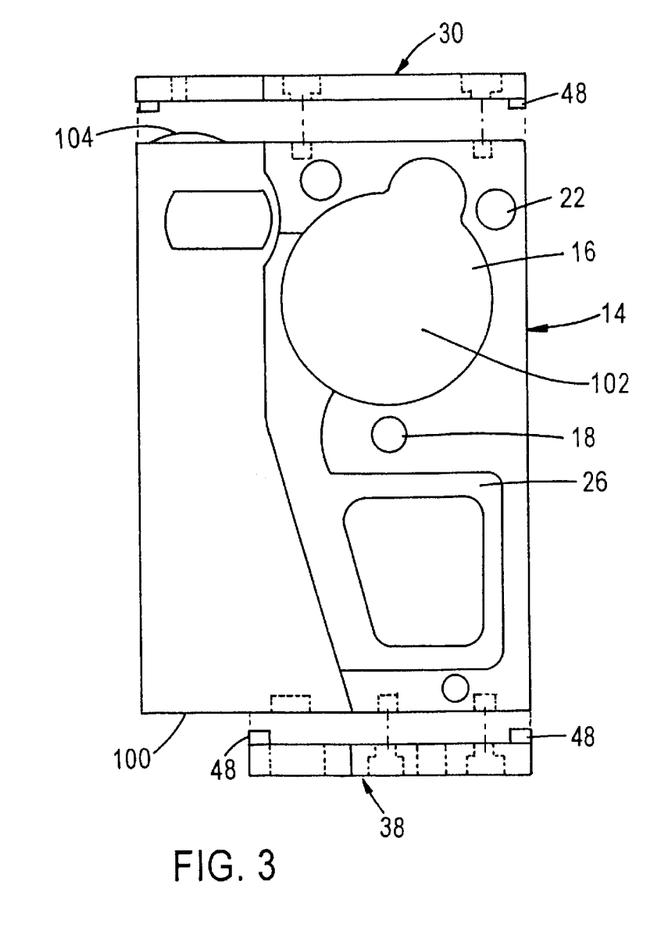
FIG. 3 is a front elevational view of the microscope adapter coupled to the camera.
Figure 4:
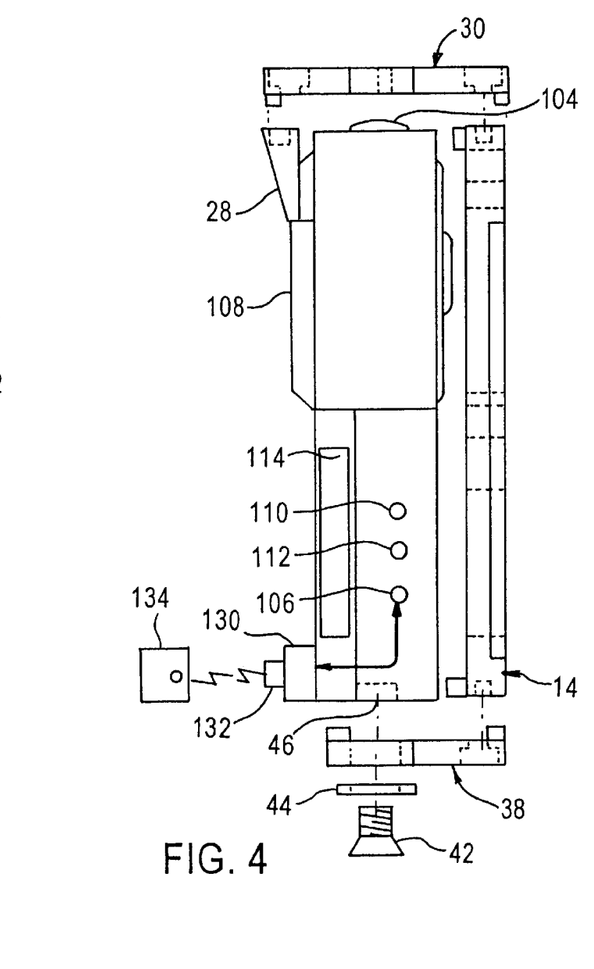
FIG. 4 is a bottom plan view of the microscope adapter coupled to the camera.

With continued reference to FIGS. 1 and 2, and additional reference to FIGS. 3 and 4, the bracket assembly 12 is shown as also including a rear stop plate 28, a first side mounting plate 30, and a second side mounting plate 38. The rear stop plate 28 contains a plurality of threaded bolt inlets 24 that facilitate attachment to the front mounting plate 14. The first side mounting plate 30 includes a threaded opening 32, and a cutout 36 that allows unencumbered access to controls of the camera 100. A plurality of threaded bolt inlets 24 are also provided for attachment to the front mounting plate 14. The second side mounting plate 38 includes a camera attachment aperture 40, a threaded tripod inlet 46, and a plurality of threaded bolt inlets 24.

As illustrated in FIGS. 3 and 4, the second side mounting plate 38 is secured to the camera 100 using a combination of a locking bolt 42 and a washer 44. It should be noted, however, that various other methods of securing the second side mounting plate 38 to the camera 100 can be employed. The primary constraint is the location of a corresponding aperture (not shown) on the camera 100 to which the second side mounting plate 38 will be correspondingly attached.

According to the depicted embodiment of the invention, the bracket assembly 12 is designed to engage the camera 100 on four corresponding surfaces thereof. Further, a plurality of securing bolts 50 are provided for assembling the bracket assembly 12 and securely retaining the camera 100. Additionally, one or more clamping gaskets 48 can be provided to increase the frictional force between the camera 100 and the bracket assembly 12 without damaging any surfaces of the camera 100.

The microscope adapter 10 of the present invention includes a displacement arrangement 52 that is movably coupled to the bracket assembly 12, and a coupler 66 that is attached to the displacement arrangement 52. The coupler 66 functions to secure the microscope adapter 10 to an eyepiece 122 of the microscope 120. As illustrated in FIG. 2, the displacement arrangement 52 includes a base plate 54 that is secured to the front mounting plate 14 of the bracket assembly 12 via a pivot bolt 56 and a tension ring 58. The pivot bolt 56 allows the displacement arrangement to be positioned in either a first position generally illustrated by the solid lines or a second position illustrated by the phantom lines. Further, the tension ring 56 provides a predetermined amount of resistance when positioning the displacement arrangement 52 in the first and second positions.

As illustrated in FIG. 2, the base plate 54 also includes a plurality of recessed magnets 22 that are positioned for appropriate interaction with the magnets 22 located on the front mounting plate 14. Accordingly, when the displacement arrangement 52 is moved to occupy the first position, the magnets 22 located on the base plate 54 are positioned in alignment with at least one of the magnets located on the front mounting plate 14. Similarly, when the displacement arrangement 52 occupies the second position, at least one of the magnets located on the base plate 54 is positioned in registry with at least one corresponding magnet on the front mounting plate 14. Hence, the displacement arrangement can be securely switched and locked (i.e., via the magnetic attraction generated) into either of the two positions.

It should be appreciated that the aforementioned arrangement of magnets is not the only method of securing the displacement arrangement 52 in the first and second positions. For example, the front mounting plate 14 can be provided with the guide slot 20 shown in FIG. 2. The guide slot 20 defines a predetermined travel arc about the pivot bolt 56 for the displacement arrangement 52. The base plate 54 of the displacement arrangement 52 can be provided with a stop pin 60 that is inserted into the guide slot 20. Accordingly, the stop pin 60 would control travel of the displacement arrangement 52 over a substantially planar path from a first end of the guide slot 20 (i.e., the first position) to a second end of the guide slot 20 (i.e., the second position). Further, various techniques, such as, for example, tapering the guide slot 20, can be used to retain the stop pin. Accordingly, the aforementioned examples should not be considered as limiting the manner in which the displacement arrangement 52 can be secured in the first and second positions.

As illustrated in FIG. 2, the displacement arrangement includes a generally tubular extension 64 attached to the base plate 54. The configuration of the tubular extension 64 naturally defines an optical passage 72 through the center thereof. Additionally, the base plate 54 contains an aperture (not shown) that is aligned with the lens 102 of the camera 100, as well as the optical passage 72 of the tubular extension 64. The tubular extension 64 includes a proximal end 68 that is attached to the base plate 54, and a distal end 70 that extends perpendicularly from the base plate 54.

According to the depicted embodiment of the invention, a coupler 66 is attached to the distal end 70 of tubular extension 64. The coupler 66 is preferably in the form of a relay lens assembly that includes appropriate optics, to be described in further details herein below, for properly transmitting the image viewed from the microscope 120 to the camera 100. In other embodiments of the invention, the tubular extension 64 itself is appropriately sized and equipped with the optics required for transferring the image from the microscope 120.

As illustrated in FIG. 1, the microscope adapter 10 is attached to the microscope 120 via the coupler 66 attached to the tubular extension 64. Accordingly, the outer diameter of the coupler 66 is of a prescribed size to correspond with the inner diameter of the eyepiece 122 of the microscope 120. More particularly, the vast majority of research microscopes incorporate eyepieces 122 having an inner diameter that is either 23 mm or 30 mm. A 23 mm eyepiece 122 is commonly used with a compound microscope, while a 30 mm eyepiece (not shown) is commonly used with a stereo microscope. It should be noted, however, that certain high magnification compound microscopes also incorporate 30 mm eyepieces. In other embodiments of the present invention wherein the required optics are disposed within the tubular extension 64, then the outer diameter of the tubular extension 64 is appropriately sized for engaging the eyepiece 122 of the microscope 120. As illustrated in FIG. 2, a friction ring 80 is disposed around the coupler 66 at a location which abuts the distal end 70 of the tubular extension 64. The friction ring 80 reacts in response to then weight of the camera 100 to reduce external forces that can cause the coupler 66 to rotate within the eyepiece 122 of the microscope 120.

Figure 5:
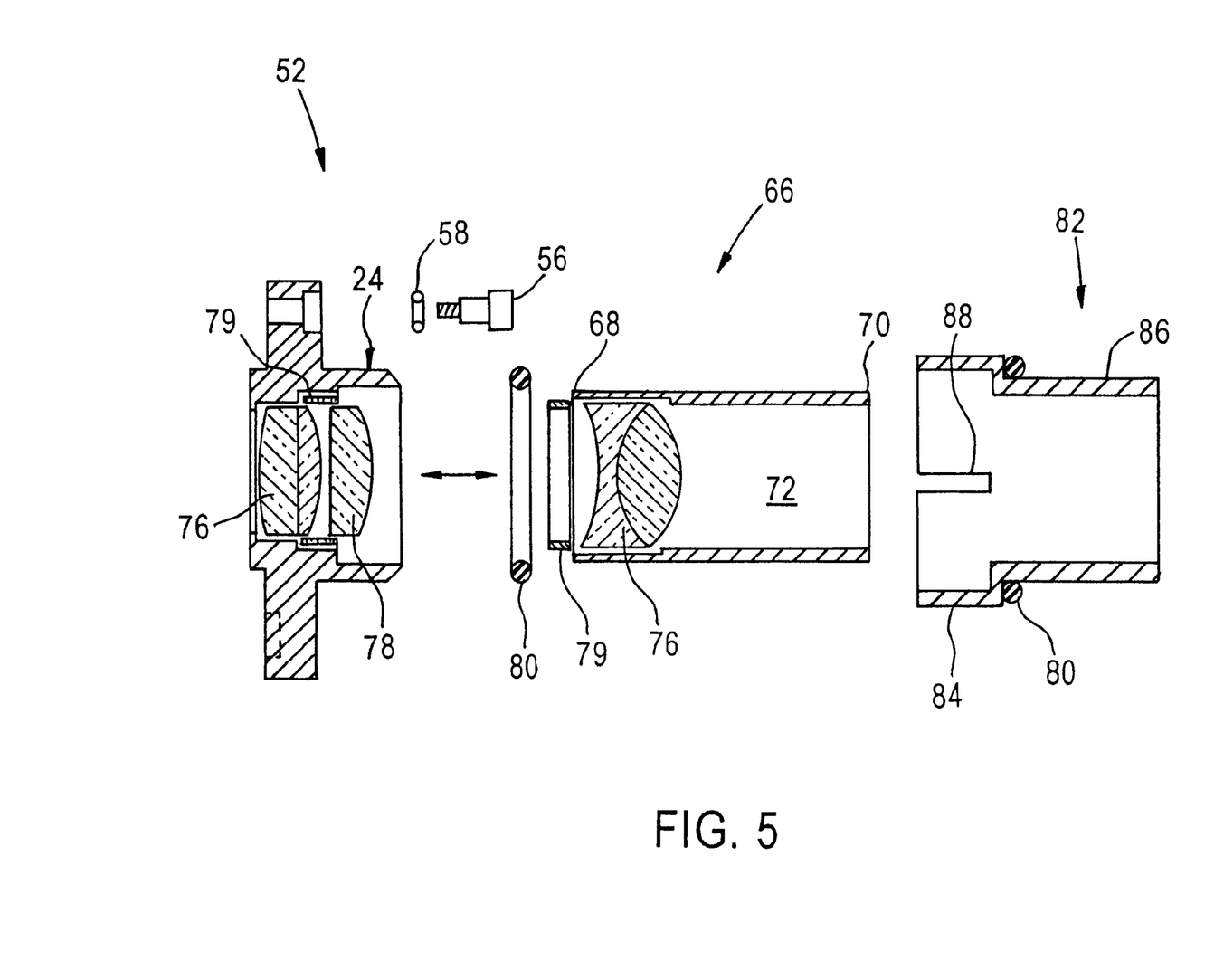
FIG. 5 is a cross-sectional view illustrating the arrangement of various components of the microscope adapter.

According to the disclosed embodiment of the invention, the microscope adapter 10 is designed such that it can be easily adapted for use with either a compound microscope or a stereo microscope. This accomplished by providing a lens adapter 82 that can be fitted over the coupler 66. As illustrated in FIGS. 2 and 5, the lens adapter 82 includes a base portion 84 and a tubular extension 86 extending from the base portion 84. The tubular extension 86 of the lens adapter 82 is appropriately sized to include a 30 mm outer diameter. In addition, the base portion 84 of the lens adapter 82 includes a plurality of expansion slits 88 that allow a snug, but removable, fit over the tubular extension 64 of the displacement arrangement 52. A friction ring 80 can also be disposed on the lens adapter 82 in order to reduce movement thereof within the eyepiece of the microscope 120.

According to the depicted embodiment of the invention, a release mechanism can be provided for engaging a shutter release 104 of the camera 100 and capturing an image viewed through the microscope 120 with reduced movement of the camera 100 during the exposure process. As illustrated in FIG. 2, the release mechanism is in the form of a cable 90 having a hollow interior and including a proximal end and a distal end. A threaded connector 92 is coupled to the distal end of the cable 90 and configured for engaging the threaded opening 32 contained in the first side mounting plate 30. Once engaged, the threaded connector 92 securely attaches the cable 90 to the bracket assembly 12. An actuator 94 having a proximal end and a distal end is movably disposed within the cable 90. A trigger mechanism 96 is attached to the cable 90 for effecting movement of the actuator 94. More particularly, the trigger mechanism 96 is capable of pushing or pulling the actuator 94 within the cable 90 and causing the distal end of the actuator 94 to engage the shutter release 104 of the camera 100.

While the release mechanism is illustrated as being in the form of a cable/actuator combination, it should be noted that various other arrangement can be used for remotely engaging the shutter release 104 of the camera 100. For example, an electronic control unit 130 including an electronic actuator (not shown) can be attached to the bracket assembly 12. Such an electronic control unit 130 can also include an infrared receiver 132 (or other appropriate wireless signal reception unit). An infrared remote unit 134 (or other appropriate transmitter) can be used to transmit a signal to the electronic control unit 130 in order to engage the electronic actuator thereby causing the shutter release 104 of the camera 100 to be engaged. Alternatively, the electronic control unit 130 can be coupled to an input/output port 106 of the camera 100 in order to transmit a control signal that causes shutter release 104 of the camera 100 to be engaged.

An electronic control unit 130 coupled to the input/output port 106 of the camera 100 advantageously provides an ability to directly connect the camera 100 to a computer (not shown). Such an arrangement allows images viewed through the camera 100 to be displayed on a monitor (not shown) of the computer. Additionally, data corresponding to photographed images can be directly transferred to the computer for subsequent video/data processing, if necessary, and/or incorporation into a presentation program. Further, the computer can be used to control the camera 100 for capturing images. One benefit of such an arrangement is for use with samples that can change with time. Specifically, the sample can be viewed on the computer monitor until a required state is reached, at which time the operator can quickly capture the image with a simple keystroke. Alternatively, preset conditions can be programmed into the computer in order to automatically capture the image once a certain state is reached.

FIG. 5 illustrates an exemplary embodiment for the optics used in the displacement arrangement 52 and coupler 66 of the present invention. According to the illustrated embodiment, the coupler 66 is in the form of a relay lens assembly that contains an achromatic lens 76 disposed therein. Additionally, a double convex lens 78 is positioned in alignment with the achromatic lens 76. A second achromatic lens 76 is disposed within the relay lens assembly and separated from the double convex lens 78 by a lens spacer 79. The arrangement illustrated in FIG. 5 is designed to provide a 1-to-1 transfer of the image viewed through the eyepiece 122 of the microscope 120 to the camera 100. Accordingly, it should be appreciated that various other optical arrangements (i.e. lens combinations) can be utilized with the same result. In addition, as previously stated, the entire optical arrangement can be contained within the relay lens assembly or entirely contained within the displacement arrangement, rather than being divided between the relay lens and the displacement arrangement.

As suggested by FIGS. 2–4, the bracket assembly 12 is in the form of multiple components that must be assembled to retain the camera 100. This is accomplished via the threaded bolt inlets 24 provided in the front mounting plate 14, the rear stop plate 28, the first side mounting plate 30, and the second side mounting plate 38. Specifically, the components of the bracket assembly 12 can be aligned such that each threaded bolt inlet 24 is positioned in registry with a corresponding threaded bolt inlet 24. The securing bolts 50 are then used to securely construct the bracket assembly 12. Additionally, the locking bolt 42 ensures that the camera is attached to the bracket assembly 12.

Figure 6:
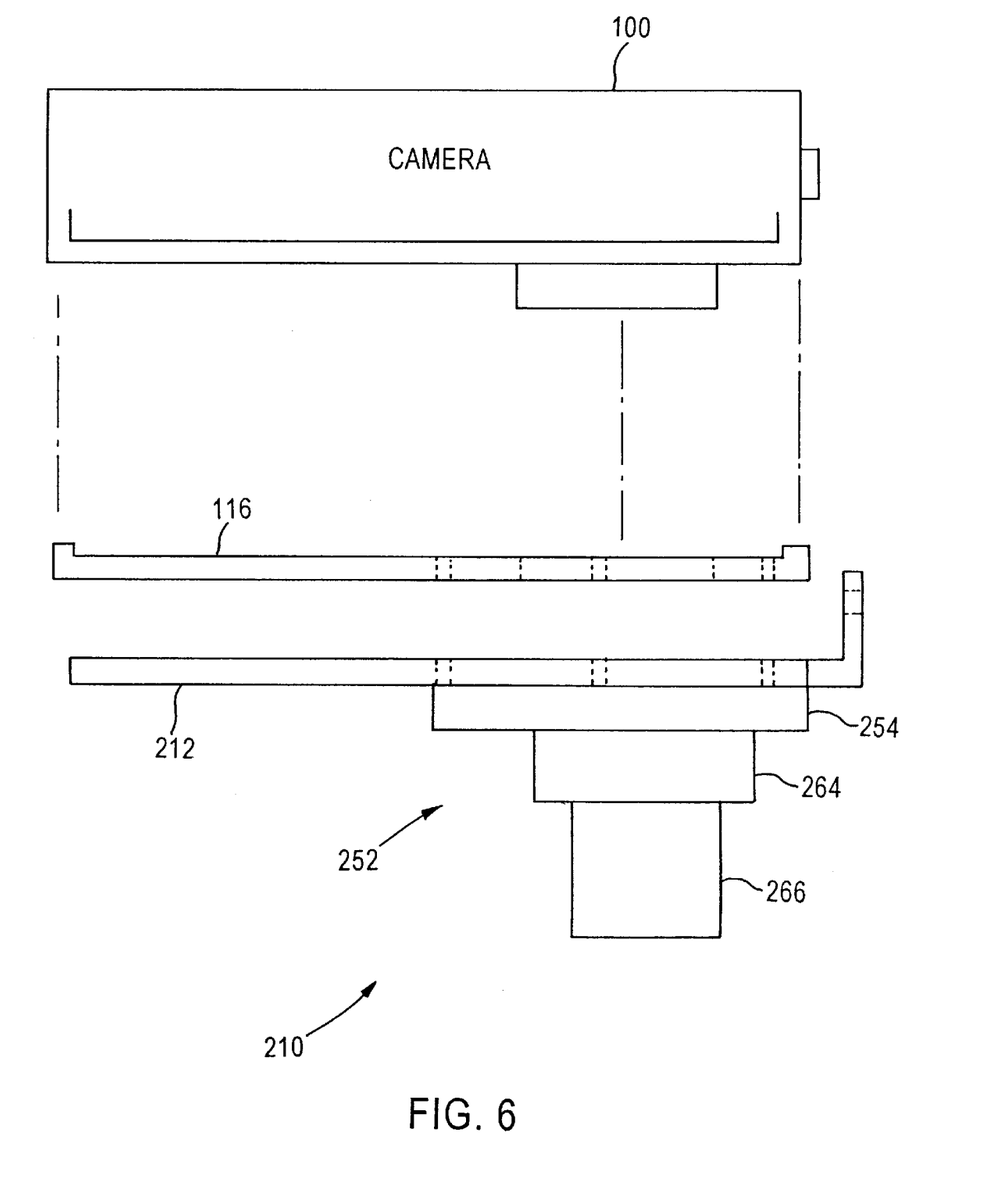
FIG. 6 is a front elevational view of an alternative embodiment for a microscope adapter.

FIG. 6 illustrates a microscope adapter 210 according to another embodiment of the present invention. The microscope adapter 210 includes a mounting bracket 212, a displacement arrangement 252, and a coupler 266. As illustrated in FIG. 6, the mounting bracket 212 is of unitary construction. The displacement arrangement 252 is movably coupled to the bracket assembly 212, and includes a base plate 254 that is secured to the front of the mounting bracket 212. As previously discussed with reference to FIGS. 1–5, the base plate 254 can be placed in either a first or second position. This can be easily accomplished by securing the base plate 254 using, for example, a combination of a pivot bolt and tension ring, as previously described. The base plate 254 includes a tubular extension 264 extending from a surface thereof. A coupler 266 is attached to the displacement arrangement 252 in order to secure the microscope adapter 210 to an eyepiece 122 of the microscope 120. The microscope adapter 210 illustrated in FIG. 6 also includes components retaining the displacement arrangement 252 within the first and second positions. These components have been previously described with reference to FIGS. 1–5 and, hence, will not be described again. The mounting bracket 212 is attached directly to a front panel 116 of the camera 100. Various techniques (e.g., fasteners, adhesives, and welding) can be used to attach the mounting bracket 212 to the camera 100. Such an arrangement has an advantage of eliminating the multiple components needed to assemble the bracket assembly 12.

It should be noted, that various other arrangements for retaining the camera 100 can be used. For example, the mounting bracket 212 illustrated in FIG. 6 can be designed as a molded cover that replaces the original front panel 116 of the camera 100. Hence, such an arrangement would incorporate all of the functions of the camera's front panel into the mounting bracket 212. Such an arrangement would provide an more natural, "factory" type appearance to the camera 100.

Alternatively, the front mounting plate can be divided into 2 distinct portions. The first portion can be permanently coupled to the rear stop plate and the first side mounting plate, while the second portion can be permanently formed with the second side mounting plate. Additionally, an adjustable joint can be used to interconnect the 2 portions of the front mounting plate. Preferably, such a joint can include a system for adjusting the width of the front mounting plate. Such an arrangement provides a benefit of allowing the bracket assembly to be used with cameras of various sizes.

Figure 7:
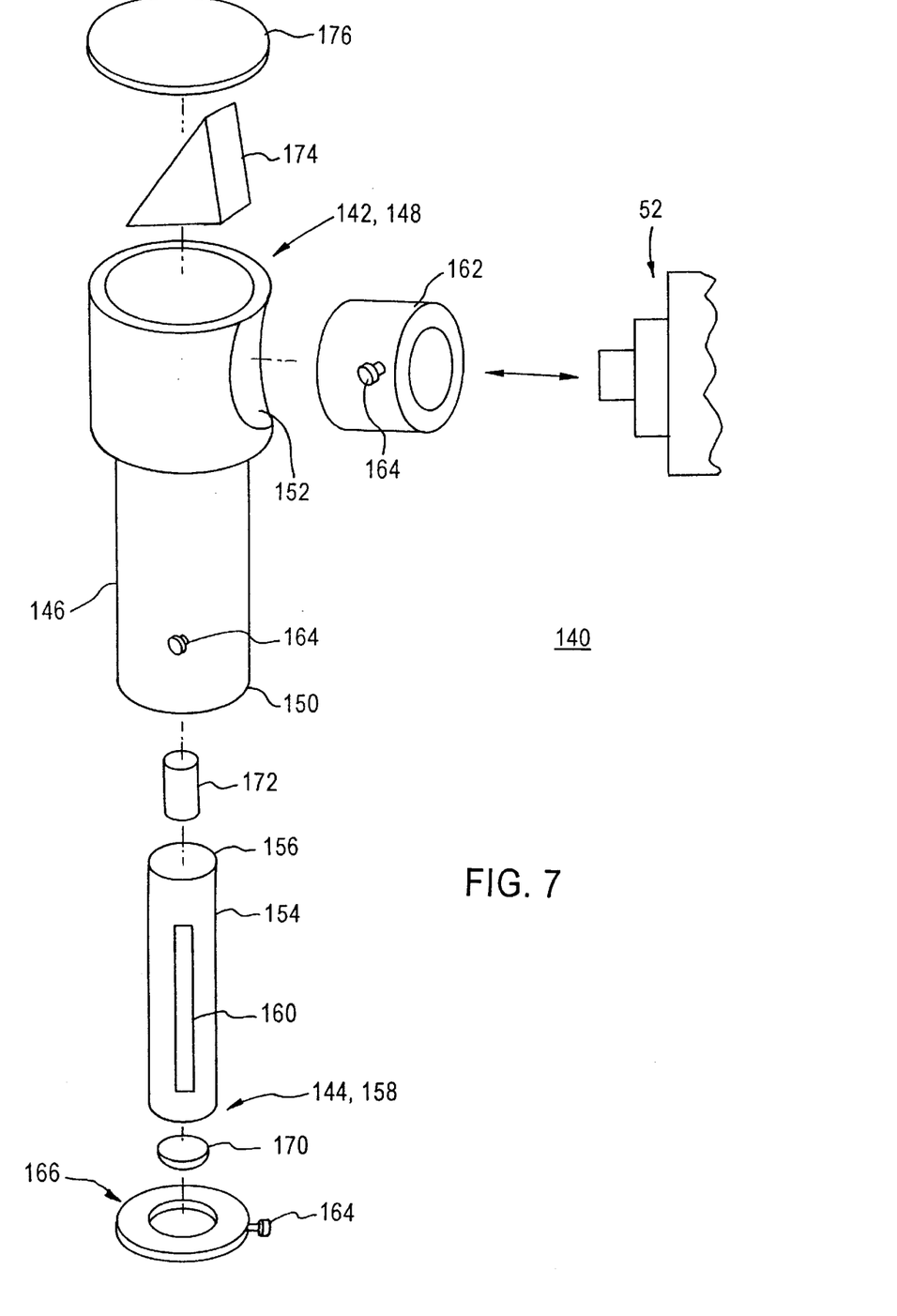
FIG. 7 is an exploded view of a phototube adapter according to an embodiment of the present invention.

Microscopes 120 are commonly equipped with an auxiliary viewing adapter, such as a trinocular tube (not shown) that allows the image being viewed through the microscope 120 to be displayed in an auxiliary viewing device independent of the eyepiece 122. The present invention is capable of utilizing such a feature to provide an alternative method of mounting the camera 100 to the microscope 120. Referring to FIG. 7, a phototube adapter 140 can be used to ergonomically connect the microscope adapter 10 of the present invention to the trinocular tube such that particular features of the camera 100 are advantageously positioned. For example when the present invention is used in conjunction with a digital type camera 100, the phototube adapter 140 positions the microscope adapter 10 such that a liquid crystal display 108 of the camera 100 is facing the operator. As illustrated in FIG. 4, digital cameras 100 typically include features and components such as an input output port 106, a power supply port 110, a video output 112, and a media storage port.

As illustrated in FIG. 7, the phototube adapter 140 includes a first end 142, a second end 144, an outer body 146, an inner body 154, and a mounting port 162. The outer body 146 has a generally tubular configuration and includes a proximal end 148 and a distal end 150. The proximal end 148 of the outer body 146 corresponds to the first end 142 of the phototube adapter 140. The outer body 146 also includes an aperture 152 extending perpendicularly from its surface. The inner body 154 also has a generally tubular configuration and includes a proximal end 156 and a distal end 158. The inner body 154 has an outer diameter that is sized for insertion into the outer body 146. When inserted into the outer body 146, the distal end 158 of the inner body 154 corresponds to the second end 144 of the phototube adapter 140. The inner body 154 also includes a conduit 160 extending along its length on the outer surface thereof. A mounting port 162 having a tubular configuration is secured within the aperture 152 of the outer body 146 such that it extends perpendicularly therefrom. In addition, the mounting port 162 has an inner diameter that is sized for receiving the coupler 66 therethrough.

As illustrated in the FIG. 7, a thumb screw 164 is provided on the mounting port 162 in order to further secure the coupler 66. A parfocalizing stop 166 is provided to limit the distance which the inner body 154 extends into the trinocular tube. The phototube adapter 140 also includes an optical arrangement 168 that directs the image received from the trinocular tube to the mounting port 162 so that it can be captured by the camera 100.

According to the disclosed embodiment of the invention, the optical arrangement 168 includes a plano-convex lens 170 positioned at the distal end of the inner body 154, and a relay lens, such as a collimating lens 172, disposed within the inner body 154. Further, the collimating lens 172 provides a 1-to-1 picture ratio, as with the optical arrangement 168 of the coupler 66. A right angle prism 174 is disposed at the proximal end 148 of the outer body 146 in order to direct the image transferred through the phototube adapter 140 to the lens 102 of the camera 100. Although the optical arrangement 168 disposed within the phototube adapter 140 is shown as including a plano-convex 170, a collimating lens 172, and a right angle prism 174, it should be noted that various other lens/prism arrangements can be utilized to transfer the image so long as a 1-to-1 picture ratio is maintained. Furthermore, the inner body 154 is capable of moving within the outer body 146 in order to vary the magnification factor, or adjust the quality of the image that is viewable by the camera 100. According to such an embodiment, a thumb screw 164 is also provided on the outer body 146 for engaging the channel 160 of the inner body 154 and locking the inner and outer body 154, 146 into a desired orientation.

The present invention advantageously provides an ability to quickly and easily attach a camera to a microscope so that pictures of images viewed through the microscope can be captured. This is accomplished without the need for special adapters or lenses specific to the camera being used. The present invention can be used in conjunction with various types of camera systems, including, but not limited to, 35 mm point-and-shoot cameras, digital cameras, and self developing cameras.

One benefit of the present invention is the ability to attach a camera to either a compound microscope or a stereo microscope without the need for a special adapters that are uniquely designed for a specific camera/microscope pair. The present invention advantageously eliminates the difficulties associated with attempting to attach standard consumer cameras to a microscope, because no specialized adapters are required. In addition, the present invention allows a camera to be quickly and easily converted from a system for taking microscopic pictures to a standard system for taking pictures. Specifically, the displacement arrangement allows the coupler to be quickly and easily moved from the path of the camera lens so that the camera can be used in a normal manner when removed from the microscope. Importantly, the bracket assembly of the present invention is designed such that it does not eliminate or reduce the standard features of the camera. For example, various apertures and cut-outs are provided so that all of the features of the camera can easily be accessed. Furthermore, the second side mounting plate is provided with a threaded tripod inlet so that a standard tripod can be used for mounting the camera when taking still photographs.

The microscope adapter of the present invention can be constructed of various materials (e.g., plastic, fiber reinforced composites, metals, and metallic alloys), depending on the required needs of the user. For example, the microscope adapter can be constructed of plastic or fiber reinforced composites in order to provide a lightweight unit that will not add unnecessary weight to the camera. Additionally, various manufacturing techniques (e.g., extrusion, injection molding, etc.) can be used to form the microscope adapter.

The present invention enjoys applicability in various scientific fields. One such field is that of forensic science and investigation. The present invention allows an investigator to use the same camera for macroscopic photography in the field and microscopic photography in the laboratory. Importantly, the microscopic photography can be performed using any microscope. This can prove particularly beneficial because the investigator may be required to travel between various locations for a particular case. Scientists required to present the results of research studies can also benefit from the present invention because a digital camera can be used to quickly capture results and formatted for display during a presentation.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. Apparatus for operatively connecting a camera to a microscope, said apparatus comprising:
    a bracket assembly for securely retaining the camera;
    a displacement arrangement movably coupled to said bracket assembly; and
    a coupler attached to said displacement arrangement for securing said apparatus to an eyepiece of the microscope, said coupler having a generally cylindrical configuration and defining an optical passage;
    wherein the displacement arrangement is configured to rotate on the bracket assembly to assume, selectively, a first position in which optical aligment is established between the camera and coupler, and a second position in which the camera and coupler are optically decoupled from each other, and includes a stop for releasably retaining the displacement arrangement in the first position;
    and wherein, with the displacement arrangement in the first position, an image that is viewable through the eyepiece of the microscope can be photographed by the camera.

2. The apparatus of claim 1, wherein said bracket assembly includes a tripod mount for mounting said apparatus on a tripod.

3. The apparatus of claim 1, wherein said bracket assembly comprises a mounting bracket.

4. The apparatus of claim 1, wherein said coupler includes an achromatic lens disposed therein for relaying the image viewed through the eyepiece to the camera with prescribed characteristics.

5. The apparatus of claim 1, further comprising a friction ring disposed at a junction of said displacement arrangement and said coupler for reducing rotational movement of said apparatus when connected the camera to the microscope.

6. The apparatus of claim 1, wherein the microscope is a compound microscope, and said coupler includes a proximal end and a distal end, said coupler further having a predetermined outer diameter sufficient for insertion into the eyepiece of the compound microscope.

7. The apparatus of claim 6, wherein said prescribed outer diameter is approximately 23 mm.

8. The apparatus of claim 1, wherein the microscope is a stereo microscope, and further comprising an adapter having a generally cylindrical configuration and configured for securely receiving said coupler therethrough, said adapter having a predetermined outer diameter sufficient for insertion into the eyepiece of the stereo microscope.

9. The apparatus of claim 8, wherein said predetermined outer diameter is approximately 30 mm.

10. The apparatus of claim 1, further comprising a release mechanism for remotely engaging a shutter release of the camera and capturing the image with reduced movement of the camera during exposure.

11. The apparatus of claim 10, wherein said release mechanism comprises:
    a cable having a proximal end and a distal end;
    a threaded connector coupled to the distal end of said cable for securing said release mechanism to said bracket assembly at a location sufficient for engaging the shutter release of the camera;
    an actuator movably disposed within said cable, said actuator including a proximal end and a distal end; and
    a trigger mechanism for pushing said actuator within said cable and causing the distal end of said actuator to engage the shutter release of the camera.

12. The apparatus of claim 10, wherein the camera includes an input/output port, and said release mechanism comprises:
    an electronic control unit operatively coupled to the input/output port of the camera, said electronic control unit including an infrared receiver; and
    an infrared remote unit for transmitting an infrared signal to said electronic control unit;

said infrared signal causing said electronic control unit to generate a control signal for releasing the shutter of the camera.

13. The apparatus of claim 1, wherein the microscope includes a trinocular tube for viewing the image independent of the eyepiece of the microscope, and further comprising a phototube adapter having a first end coupled to the trinocular tube and a second end secured to said apparatus.

14. The apparatus of claim 13, wherein said phototube adapter includes:
    an outer body of generally tubular configuration, said outer body having a proximal end and a distal end, and said outer body containing an aperture on a surface of said proximal end;
    a mounting port secured within said aperture and extending perpendicularly from a surface of said outer body for attaching said coupler to said phototube adapter;
    an inner body of generally tubular configuration, said inner body having a proximal end configured for insertion into said outer body, and a distal end configured for receiving said coupler therein; and
    an optical arrangement for directing the image received from the trinocular tube to said mounting port for capture by the camera.

15. The apparatus of claim 14, wherein said phototube adapter further comprises a parfocalizing stop operatively coupled to said inner body for synchronizing focus of the image viewed through the microscope with the image captured by the camera.

16. The apparatus of claim 1, including a pivot member connecting the displacement arrangement to the bracket mechanism, in which the pivot member is configured to secure the rotational position of the displacement mechanism relative to the bracket assembly.

17. The apparatus of claim 16, wherein the pivot member comprises a threaded bolt and a tension ring assembly.

18. A microscopic photography system comprising:
    a camera including a camera lens;
    a microscope including at least one eyepiece for viewing a sample; and
    a microscope adapter for operatively connecting said camera to said microscope, said microscope adapter including:
        a bracket assembly for securely retaining said camera,
        a displacement arrangement movably coupled to said bracket assembly, and
        a coupler attached to said displacement arrangement for securing said apparatus to the eyepiece of said microscope, said coupler having a generally cylindrical configuration and defining an optical passage;
    wherein the displacement arrangement is configured to rotate on the bracket assembly to assume, selectively, a first position in which optical alignment is established between the camera and coupler, and a second position in which the camera and coupler are optically decoupled from each other, and includes a stop for releasably retaining the displacement arrangement in the first position;
    and wherein, with the displacement arrangement in the first position, an image that is viewable through the eyepiece of the microscope can be photographed by the camera.

19. A kit for microscopic and macroscopic photography comprising:
    a camera;
    a bracket assembly sized to securely retain the camera, said bracket assembly including:
        a displacement arrangement movably coupled thereto, and
        a coupler attached to said displacement arrangement for securing said bracket assembly to an eyepiece of a microscope,
    wherein the displacement arrangement is configured to rotate on the bracket assembly to assume, selectively, a first position in which optical alignment is established between the camera and coupler, and a second position in which the camera and coupler are optically decoupled from each other, and includes a stop for releasably retaining the displacement arrangement in the first position;
    and wherein, with the displacement arrangement in the first position, an image that is viewable through the eyepiece of the microscope can be photographed by the camera;
    a release mechanism attachable to said bracket assembly for remotely engaging a shutter release of the camera and capturing the image with reduced movement of the camera during exposure; and
    an adapter for attaching said coupler to a microscope having a 30 mm eyepiece.

20. The kit of claim 19, further comprising a phototube adapter for attaching said coupler to a trinocular tube of the microscope.

21. Apparatus for operatively connecting a camera to a microscope, said apparatus comprising:
    a bracket assembly for securely retaining the camera;
    a displacement arrangement movably coupled to said bracket assembly; and
    a coupler attached to said displacement arrangement for securing said apparatus to an eyepiece of the microscope, said coupler having a generally cylindrical configuration and defining an optical passage;
    wherein the displacement arrangement is configured to rotate on the bracket assembly to assume, selectively, a first position in which optical alignment is established between the camera and coupler, and a second position in which the camera and coupler are optically decoupled from each other, and wherein, with the displacement arrangement in the first position, an image that is viewable through the eyepiece of the microscope can be photographed by the camera; and
    at least one magnet pair on said displacement arrangement and bracket assembly, respectively, for releasably holding the displacement arrangement selectively in the first and second rotational positions on the bracket assembly.

22. The apparatus of claim 21, including a pivot member connecting the displacement arrangement to the bracket mechanism, in which the pivot member is configured to secure the rotational position of the displacement mechanism relative to the bracket assembly.

23. The apparatus of claim 22, wherein the pivot member comprises a threaded bolt and a tension ring assembly.

24. The apparatus of claim 21, including a cylindrical coupler attached to a shoulder enabling a microscope eyepiece to frictionally engage with the displacement assembly.

25. A camera for capturing images viewable through a microscope, said camera comprising:
    a camera body including a camera lens and a shutter release button; and a microscope adapter including:
  a displacement arrangement movably coupled to said camera body, and
  a coupler attached to said displacement arrangement for securely retaining said microscope adapter to an eyepiece of the microscope, said coupler having a generally cylindrical configuration and defining an optical passage that is positionable in registry with said camera lens;
wherein the displacement arrangement is configured to rotate on the bracket assembly to assume, selectively, a first position in which optical alignment is established between the camera and coupler, and a second position in which the camera and coupler are optically decoupled from each other, and includes a stop for releasably retaining the displacement arrangement in the first position;

and wherein, with the displacement arrangement in the first position, an image that is viewable through the eyepiece of the microscope can be photographed by the camera.

* * * * *